United States Patent [19]

Haskal et al.

[11] Patent Number: 4,514,047
[45] Date of Patent: Apr. 30, 1985

[54] ON-AXIS ACHROMATIC QUARTERWAVE RETARDER PRISM

[75] Inventors: Haim M. Haskal; Robert A. Briones, both of Colorado Springs, Colo.

[73] Assignee: Magnetic Peripherals Inc., Bloomington, Minn.

[21] Appl. No.: 433,933

[22] Filed: Oct. 12, 1982

[51] Int. Cl.³ .............................................. G02F 1/00
[52] U.S. Cl. ..................................... 350/394; 350/402
[58] Field of Search ............................... 350/402, 394

[56] References Cited

U.S. PATENT DOCUMENTS 3,635,563  1/1972  Mouchart ........................... 356/114
3,969,573  7/1976  Bouwhuis et al. ................ 178/6.6 R
4,379,622  4/1983  Fischer et al. ....................... 350/394

OTHER PUBLICATIONS

J. M. Bennett, "A Critical Evaluation of Rhomb-Type Quarterwave Retarders", Applied Optics, Sep. 1970, vol. 9, No. 9, pp. 2123-2129.

Primary Examiner—John K. Corbin
Assistant Examiner—Lynn Vandenburgh Kent
Attorney, Agent, or Firm—W. J. McGinnis; J. A. Genovese

[57] ABSTRACT

A quarterwave retarder prism such as can be used in optical recording has a shape similar to a dove prism, and has three internal reflections, with the retarder prism designed to have the emerging light beam on the same axis or collinear with the entering light beam such that the accumulated phase retardation in the device is one quarterwave over a wide range of wavelengths of light.

2 Claims, 2 Drawing Figures $$\tan \frac{\delta}{2} = \frac{\cos\theta \sqrt{\sin^2\theta - n^{-2}}}{\sin^2\theta} \quad (1)$$

$$\text{FOR } \delta = \frac{\pi}{6}$$

$$\sin^2\theta = \frac{1+n^{-2} \pm \sqrt{(1+n^{-2})^2 - 4(n\cos\frac{\pi}{12})^{-2}}}{2(\cos\frac{\pi}{12})^{-2}} \quad (2)$$

$$\alpha + \sin^{-1}\left(\frac{\cos}{n(\lambda_o)}\right) - \theta(\lambda_o) = 0 \quad (3)$$

$\lambda = \lambda_o$, THE DESIGN WAVELENGTH $$\frac{l}{d} = 3\tan\theta + (\tan\alpha)^{-1} \quad (4)$$

FIG. 1

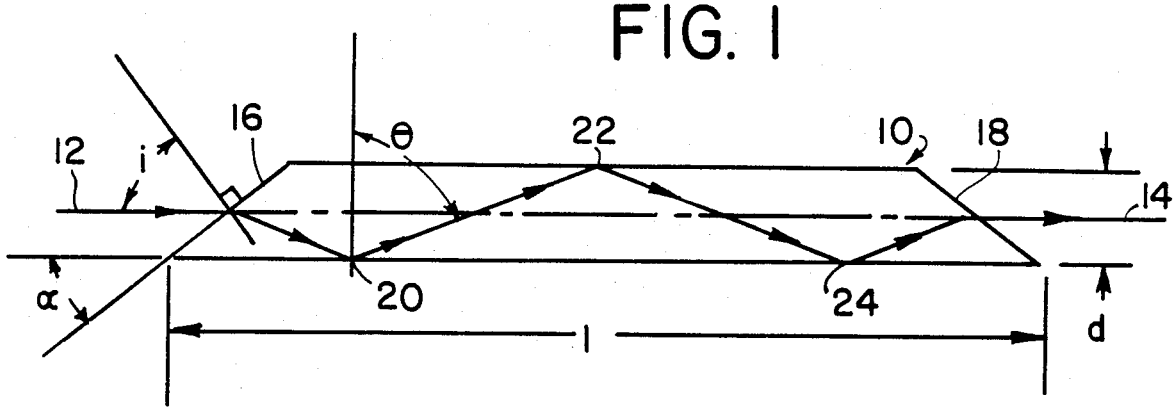

$$\text{TAN}\frac{\delta}{2} = \frac{\cos\theta\sqrt{\sin^2\theta - n^{-2}}}{\sin^2\theta} \qquad (1)$$

$$\text{FOR } \delta = \frac{\pi}{6}$$

$$\sin^2\theta = \frac{1+n^{-2} \pm \sqrt{(1+n^{-2})^2 - 4(n\cos\frac{\pi}{12})^{-2}}}{2(\cos\frac{\pi}{12})^{-2}} \qquad (2)$$

$$\alpha + \sin^{-1}\left(\frac{\cos}{n(\lambda_0)}\right) - \theta(\lambda_0) = 0 \qquad (3)$$

$\lambda = \lambda_0$, THE DESIGN WAVELENGTH $$\frac{l}{d} = 3\text{ TAN }\theta + (\text{TAN }\alpha)^{-1} \qquad (4)$$

ON-AXIS ACHROMATIC QUARTERWAVE RETARDER PRISM

BACKGROUND OF THE INVENTION

This invention relates to optical devices known as quarterwave retarders. In particular this invention relates to an achromatic quarterwave retarder prism for which the emerging light beam is on the same axis or collinear with the entering light beam. The device according to the present invention is achromatic and may also be referred to as a broadband device in that it will work as intended for a wide range of light wavelengths about a preselected wavelength. The device according to the present invention may have general optical applications, but it is found to be particularly useful in the optical recording art.

The optical recording art in a typical application has the laser light beam passing through an optical system including a quarterwave device to a moving optical medium from which the light modulated by information from the moving media is reflected back through the same quarterwave device and reflected in a polarizing beam splitter in a different direction to a light sensitive device which reads the intensity of the reflected light beam from the optical media. Use of quarterwave devices and the optical systems employing them in the optical recording art is discussed in numerous U.S. patents. Of particular interest is U.S. Pat. No. 3,969,573 which discusses the requirements of the quarterwave retarder as used in optical recording in great detail as well as showing as an invention a different type of quarterwave device which is unrelated to the present invention. However, that patent does illustrate that the need for a suitable quarterwave device is critical to the optical recording art. A typical quarterwave retarder used in the optical recording art is a so-called quarterwave plate having end faces parallel to the optical axis.

Other types of quarterwave retarders are known in the optical field. One useful device is the Fresnel-rhomb which is described along with other similar devices by J. M. Bennett in an article entitled "A Critical Evaluation of Rhomb-type Quarterwave Retarders," Applied Optics, Volume 9, No. 9, pgs. 2123 through 2129, September 1970. Although the Fresnel-rhomb is well known in optics, its use in optical recording would be difficult because the two internal reflections which occur in a Fresnel-rhomb cause the emerging light beam to be displaced with respect to the entering light beam. This displacement in the light path causes complications in optical system implementation. The dimensions are already critical in optical recording systems. Therefore, it is desirable in optical recording systems to have an on-axis or collinear quarterwave retarder device.

Also known in the prior art is U.S. Pat. No. 3,635,563 which shows a parallelogram-shaped prism in which the light undergoes four total internal reflections and emerges on a different optical axis than the entering optical axis. The entering and emerging light beams pass through prism faces which are at right angles to the optical axis. However, this patent does not anticipate the present invention although it does illustrate the use of the laws of optics as applied to internal reflections in prisms.

SUMMARY OF THE INVENTION

The present invention is an achromatic quarterwave retarder prism in which light enters and emerges from the prism through faces of the prism inclined with respect to the optical axis and having three internal reflections of light to cause a quarterwave retardation of the light beam. The emerging light beam is on the same optical axis as the entering light beam over a wide range of wavelengths and is not displaced.

In the Figures:

FIG. 1 is a side view of the quarterwave retarder prism according to the present invention.

Equations 1, 2, 3, and 4 are discussed in the specification.

FIG. 2 is a graph showing the relation between aspect ratio and refraction index for one embodiment of the invention.

DESCRIPTION OF THE PREFERRED EMBODIMENT

Figure 2:
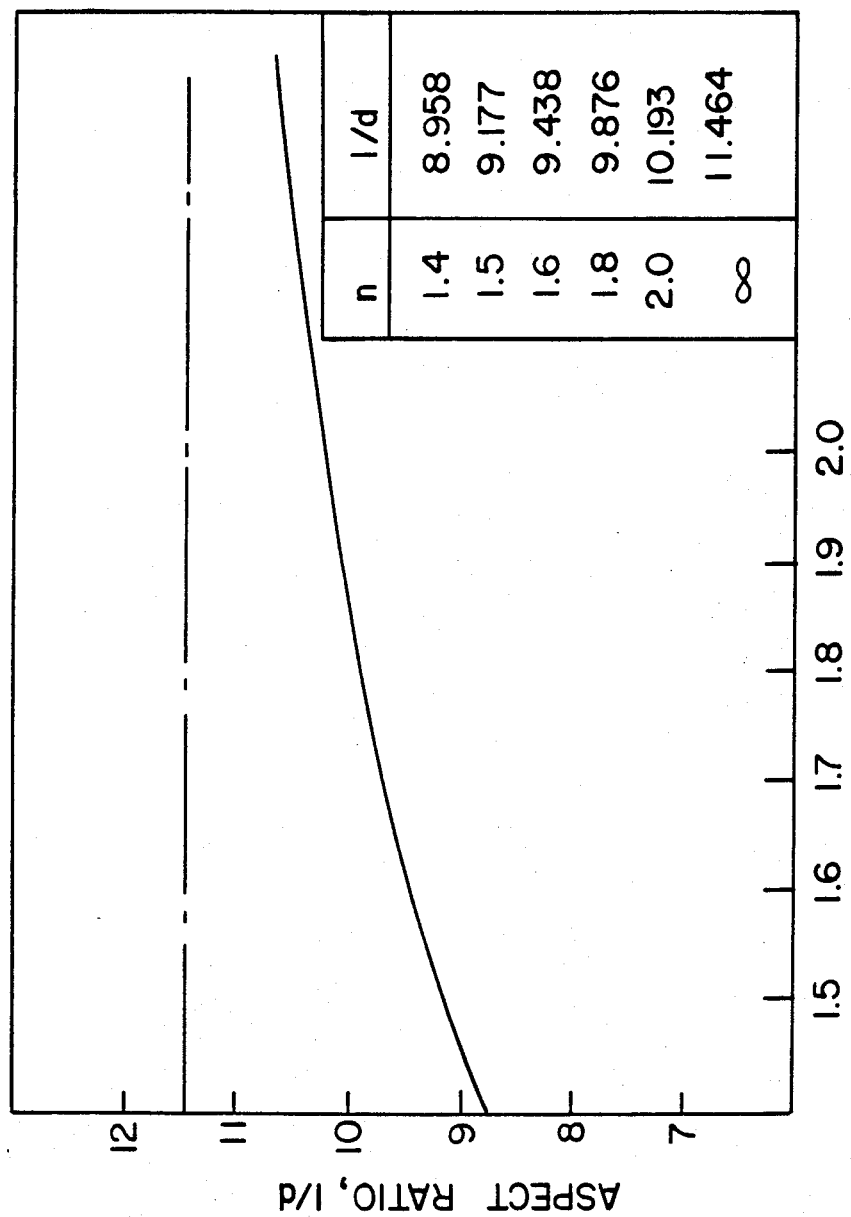

FIG. 1 shows an on-axis, collinear, achromatic quarterwave retarder prism 10 for polarized light according to the present invention. The optical axis of the entering light beam is shown diagrammatically at 12 and the optical axis of the emerging light beam is shown diagrammatically at 14. The dimension "d" shown in the drawing refers to the height of the prism while the dimension "l" refers to the length of the prism. The aspect ratio is defined as l/d. The optical path of light within the prism is shown diagrammatically with the light bending at the entering face 16 of the prism and at the exit face 18 of the prism. The internal points of reflection are shown at points 20, 22, and 24. One face on one side of the prism has one reflection while the other side of the prism has two reflections. The present prism requires the top and bottom sides to be polished for reflection while a dove-type prism requires only a single side of the prism to be polished for reflection.

The prism according to the present invention is designed according to the following principles. It is known that the light is incident at an angle $\theta$ where $\theta$ is larger than the critical angle, the retardation $\delta$ between the "s" (perpendicular) and "p" (parallel) polarization is given by the equation (equation 1 on the drawing):

$$\text{TAN} \frac{\delta}{2} = \frac{\cos\theta \sqrt{\sin^2\theta - n^{-2}}}{\sin^2\theta}$$

where "n" is the refractive index of the prism material.

Using, for example, a refractive index $n = $ to 1.5 an angle $\theta$ of 69° can be chosen by solving equation 2 on the drawing. From this the prism angle "$\alpha$" can be determined to be 36.36°.

Using the formula (equation 3 on the drawing):

$$\alpha + \text{SIN}^{-1}\left(\frac{\cos\alpha}{\eta(\lambda_o)}\right) - \theta(\lambda_o) = 0$$

and a refractive index $n = 1.5$ the length of the prism can be determined to be $l = 9.16d$ using equation 4 on the drawing which gives the aspect ratio. The prism material may be a common glass which is isotropic and no other particular critical property is necessary.

One of the advantages according to the present invention is that the retardation factor is a function of the wavelength of the light only through the dispersion factor with respect to wavelength in the refractive index n of the material. Another advantage is that a prism according to the present invention is comparatively compact having a comparatively low aspect ratio in the vicinity of 9 for a preferred embodiment. For one type of known glass, the retardation will change about 1% over a 300 nm. band width in the visible and near infrared spectrum from 600 to 900 nm.

What is claimed is:

1. A quarterwave retarder prism for polarized light having an emerging light beam optical axis collinear with the entering light beam optical axis and prism faces for the entering and emerging light beams inclined with respect to the light beams and using three internal reflections to obtain a quarterwave retardation and for which the prism angle $\alpha$ is chosen according to the following formula:

$$\alpha + \text{SIN}^{-1}\left(\frac{\text{COS}\alpha}{\eta(\lambda_o)}\right) - \theta(\lambda_o) = 0$$

2. The prism of claim 1 where the aspect ratio relationship between the length and height of the prism is determined according to the following formula:

$$l/d = 3\ \text{TAN}\ \theta + (\text{TAN}\ \alpha)^{-1}.$$

* * * * *